(12) United States Patent
Kawasumi (10) Patent No.: US 8,971,756 B2
(45) Date of Patent: Mar. 3, 2015

(54) IMAGE FORMING APPARATUS AND CONNECTING METHOD

(75) Inventor: Ryoichi Kawasumi, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 13/479,737

(22) Filed: May 24, 2012

(65) Prior Publication Data

US 2012/0308243 A1 Dec. 6, 2012

(30) Foreign Application Priority Data

Jun. 6, 2011 (JP) ................................. 2011-126668

(51) Int. Cl.
*G03G 21/16* (2006.01)
*H04N 1/00* (2006.01)

(52) U.S. Cl.
CPC ....... *G03G 21/1619* (2013.01); *H04N 1/00538* (2013.01); *H04N 1/00562* (2013.01); *G03G 2221/1651* (2013.01); *G03G 2221/1696* (2013.01); *H04N 1/00541* (2013.01); *H04N 2201/0094* (2013.01); *H04N 2201/0082* (2013.01)
USPC .......................................................... 399/110

(58) Field of Classification Search
CPC ................... G03G 21/1619; G03G 2221/1678
USPC ................................................ 399/110, 126
See application file for complete search history.

(56) References Cited

U.S. PATENT DOCUMENTS

| | | | |
|---|---|---|---|
| 6,308,025 B1 | 10/2001 | Okano et al. | |
| 7,787,801 B2 * | 8/2010 | Koyama | 399/107 |
| 8,561,476 B2 * | 10/2013 | Van Gerven et al. | 73/847 |
| 2005/0123318 A1 | 6/2005 | Nishitani et al. | |
| 2007/0246638 A1 | 10/2007 | Idehara et al. | |
| 2009/0302521 A1 * | 12/2009 | Kondo et al. | 271/9.01 |

FOREIGN PATENT DOCUMENTS

| | | |
|---|---|---|
| JP | 11-244076 A | 9/1999 |
| JP | 2000-330351 A | 11/2000 |
| JP | 2005-077498 A | 3/2005 |
| JP | 2005-148171 A | 6/2005 |
| JP | 2010-151895 A | 7/2010 |

OTHER PUBLICATIONS

Chinese Office Action dated Oct. 29, 2014, in related Chinese Patent Application No. 2012101846210 (with English translation).

* cited by examiner

*Primary Examiner* — David Gray
*Assistant Examiner* — Gregory H Curran
(74) *Attorney, Agent, or Firm* — Fitzpatrick, Cella, Harper & Scinto (57) ABSTRACT

An image forming apparatus includes: an image forming portion; an image forming portion supporting frame having opposing first and second side surfaces; first and second frame supporting portions provided, in contact to a disposition surface of the apparatus, close to the first side surface; a third frame supporting portion provided, in contact to the disposition surface, close to the second side surface; and an auxiliary leg adjustable to a height where it does not contact the disposition surface and a height where it contacts the disposition surface. The auxiliary leg is provided in a side which is away from the third supporting portion in a direction of change of the center of gravity by mounting of the optional unit to the image forming apparatus.

23 Claims, 8 Drawing Sheets

IMAGE FORMING APPARATUS AND CONNECTING METHOD

FIELD OF THE INVENTION AND RELATED ART

The present invention relates to an image forming apparatus such as a printer, a facsimile machine or a multi-function machine, and a connecting method. Especially, the present invention relates to the image forming apparatus to which an optional unit is detachably mountable and the connecting method of connecting the optional unit to the image forming apparatus.

An image forming portion has been conventionally supported by a frame of a main assembly of the image forming apparatus (hereinafter referred to as an "apparatus main assembly"). In order to form a good image, it is desired that flexure and distortion (twisting) of the frame is suppressed.

In the above-described constitution of the frame for supporting the image forming portion, where there are 4 or more legs (grounding point) contacting a disposition surface (e.g., a floor or a desk), the following problem arises. Specifically, of 4 points, one point where flatness of the disposition surface where the apparatus main assembly is disposed (placed) is poor floats, so that a force which is not less than an assumed load concentratedly acts on other 3 points to distort the frame of the apparatus main assembly. As a result, geometric accuracy of an image outputted on a recording material is worsened.

On the other hand, Japanese Laid-Open Patent Application 2000-330351 discloses a constitution in which the number of the points contacting the disposition surface of the apparatus is limited to three. Specifically, by limiting the number of supporting portions at the bottom of the apparatus to 3 points, the apparatus contacts the disposition surface always at the 3 points irrespective of an unevenness of the disposition surface and therefore distortion (twisting) of the frame can be suppressed. More specifically, the 3 grounding points includes a first grounding point and a second grounding point disposed along a lower edge line of the frame with a sufficient interval (spacing) at a certain surface side of the apparatus main assembly and includes a third grounding point disposed along a lower edge line of the frame at an opposite surface side opposing the certain surface side. Incidentally, the third grounding point is disposed in the neighborhood of a position where the center of gravity is vertically projected on the edge line at the opposite surface side, so that the flexure and distortion of the frame due to the weight of the apparatus are effectively suppressed.

On the other hand, a constitution in which various optical devices are connected to the apparatus main assembly has been known. For example, it has been known that a scanner unit for reading an original is connected to a printer as the image forming apparatus at an upper portion of the printer to provide a multi-function machine (system). Further, a constitution in which a post-processing device (so-called finisher) for subjecting a sheet outputted by the printer to a sheet-discharging process is connected to the printer has been known. Here, a position of the center of gravity in the case where the optional unit (optical device) is not connected and a position of the center of gravity in the case where the optional unit is connected are different from each other.

Here, in the apparatus to which the optional unit is detachably mountable, the position of the center of gravity is changed and therefore in a constitution in which the third grounding point is disposed correspondingly to the center of gravity in a state in which the optional unit is not mounted (connected), with the mounting of the optional unit, the flexure and distortion generated on the frame cannot be effectively suppressed.

SUMMARY OF THE INVENTION

A principal object of the present invention is to provide an image forming apparatus capable of suppressing flexure and distortion of a frame when an optional unit is mounted.

According to an aspect of the present invention, there is provided an image forming apparatus for supporting a detachably mountable optional unit, comprising: an image forming portion, including a rotatable photosensitive member, for forming a toner image formed on the photosensitive member on a recording material; a frame for supporting the image forming portion, wherein the frame has a first side surface and a second side surface opposing the first side surface; a first supporting portion and a second supporting portion, which are provided at a bottom of the frame close to the first side surface, for supporting the frame in contact to a disposition surface, wherein a rectilinear line connecting the first and second supporting portions is substantially parallel to a rotational axis of the photosensitive member; a third supporting portion for supporting the frame in contact to the disposition surface, wherein the third supporting portion is provided close to the second side surface and in a neighborhood of a rectilinear line which is perpendicular to the rectilinear line connecting the first and second supporting portions and passes through the center of gravity of the image forming apparatus in a state in which the optional unit is not mounted; and an auxiliary leg adjustable to a height where it does not contact the disposition surface and a height where it contacts the disposition surface, wherein the auxiliary leg is provided in a side which is away from the third supporting portion in a direction of change of the center of gravity by mounting of the optional unit to the image forming apparatus.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

Parts (a) and (b) of FIG. 4 are schematic views each showing an outer appearance of the image forming apparatus for illustrating a position of the center of gravity of the image forming apparatus in Embodiment 1.

Parts (a) and (b) of FIG. 5 are perspective views each showing an outer appearance of the image forming apparatus for illustrating a mounting state of an optical device of the image forming apparatus in Embodiment 1.

Parts (a), (b) and (c) of FIG. 7 are partly enlarged sectional side views for illustrating an operation process of the movable supporting leg provided on the frame of the image forming apparatus in Embodiment 1.

Parts (a) and (b) of FIG. 8 are enlarged perspective views each showing a movable supporting leg provided on a frame of an image forming apparatus in Embodiment 2.

DESCRIPTION OF THE PREFERRED EMBODIMENTS

Embodiment 1

1. General Structure and Operation of Image Forming Apparatus

Figure 1:
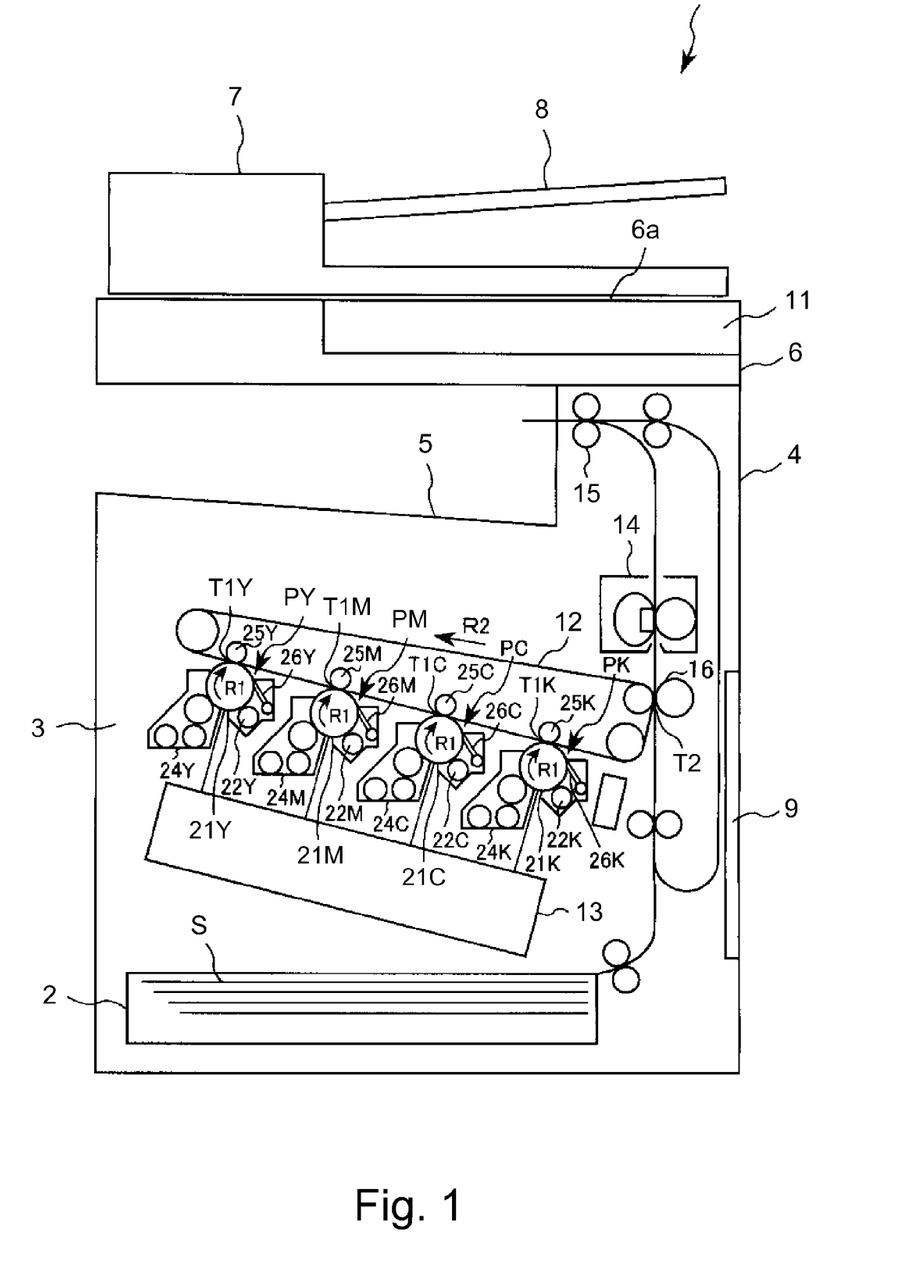
FIG. 1 is a schematic sectional view of an image forming apparatus in Embodiment 1.

FIG. 1 schematically illustrates a cross section of an image forming apparatus 1 in this embodiment. Incidentally, in the following description, the front side on the drawing sheet of FIG. 1 is referred to as a "front surface (side)" of the image forming apparatus 1 and the rear side on the drawing sheet is referred to as a "rear surface (side)" of the image forming apparatus 1. A side surface at the front side of the image forming apparatus 1 is simply referred to as the "front surface" and a side surface at the rear side of the image forming apparatus 1 is simply referred to as a "rear surface". Further, left and right of the image forming apparatus 1 are those in the case where the image forming apparatus 1 is viewed from the front surface side. In a left-right direction of the image forming apparatus 1, a left-hand side surface is also referred to as a "left side surface" and a right-hand side surface is also referred to as a "right side surface". Further, upper surface (or portion) and lower surface (or portion) of the image forming apparatus 1 are those with respect to the vertical direction in a normal operational state of the image forming apparatus 1. An upper side surface with respect to the vertical direction is also referred to as an "upper surface" and a lower side surface is also referred to as a "bottom surface". In this embodiment, the front surface and rear surface of the image forming apparatus 1 are substantially parallel to each other and the left side surface and the right side surface are parallel to each other. A rectilinear line substantially perpendicular to the front surface and the rear surface and a rectilinear line substantially perpendicular to the left side surface and the right side surface are substantially perpendicular to each other. Here, the front side of the image forming apparatus 1 is a side where an operator normally operates the image forming apparatus 1. Incidentally, in this embodiment, the "substantially parallel" refers to that the two rectilinear lines falls within ±2 degrees with respect to their intersecting angle. Further, in this embodiment, the "neighborhood" refers to a range within 20 mm in diameter from a reference point.

As shown in FIG. 1, the image forming apparatus 1 in this embodiment is a full-color multi-function machine of a tandem type in which first to fourth image forming portions PY, PM, PC and PK are provided along a movement direction of an image carrying surface of an intermediary transfer belt 12 as an intermediary transfer member. Each of the first to fourth image forming portions PY, PM, PC and PK forms a toner image by an electrophotographic process.

Constitutions and operates of the first to fourth image forming portions PY, PM, PC and PK are the substantially same except that colors of toners used are different from each other. Therefore, in the following, in the case where there is no need to differentiate the respective image forming portions, suffixes Y, M, C and K for representing the colors of associated elements or portions are omitted and the elements or portions will be collectively described.

The image forming portion P includes a drum-type electrophotographic photosensitive member as an image bearing member, i.e., a photosensitive drum 21. The photosensitive drum 21 is rotationally driven in an indicated arrow R1 direction. Around the photosensitive drum 21, along a rotational direction of the photosensitive drum 21, the following means are provided in the following order. First, a charging roller 22 as a charging means is provided. Next, a developing device 24 as a developing means is provided. Next, a primary transfer roller 25 as a primary transfer means is provided. Next, a drum cleaner 26 as a photosensitive member cleaning means is provided. Further, an exposure device (laser scanner) 13 as an exposure means is provided so as to expose to light the surface of the photosensitive drum 21 of each image forming portion P at a position between the charging roller 22 and the developing device 24 with respect to the rotational direction of the photosensitive drum 21. Each primary transfer roller 25 is disposed on an inner peripheral surface of the intermediary transfer belt 12 at a position where it opposes the associated photosensitive drum 21. Further, the primary transfer roller 25 urges the intermediary transfer belt 12 toward the photosensitive drum 21 to form a primary transfer portion (primary transfer nip) T1 where the intermediary transfer belt 12 is contacted to the respective photosensitive drums 21. Further, on an outer peripheral surface of the intermediary transfer belt 12, a secondary transfer roller 16 as a secondary transfer means is provided at a position where it opposes a secondary transfer opposite roller which is one of a plurality of rollers by which the intermediary transfer belt 12 is stretched. The secondary transfer roller 16 is urged against the intermediary transfer belt 12 toward the secondary transfer opposite roller to form a secondary transfer portion (secondary transfer nip) T2 where the second transfer roller 16 is contacted to the intermediary transfer belt 12.

At the image forming portion P, the surface of the rotating photosensitive drum 21 is uniformly charged by the charging roller 22. The charged surface of the photosensitive drum 21 is subjected to scanning exposure to light by the exposure device 13 in accordance with image information corresponding to the associated image forming portion P. As a result, an electrostatic latent member (electrostatic image) corresponding to the image information is formed on the photosensitive drum 21. The electrostatic latent image formed on the photosensitive drum 21 is developed as the toner image by being supplied with the toner as a developer by the developing device 24. The toner image formed on the photosensitive drum 21 is primary-transferred onto the intermediary transfer belt 12 rotated in an indicated arrow R2 direction.

At the first image forming portion PY, a yellow toner image is formed and then is primary-transferred onto the intermediary transfer belt 12. At the second image forming portion PM, a magenta toner image is formed and then is primary-transferred superposedly onto the yellow toner image on the intermediary transfer belt 12. At the third and fourth image forming portions, a cyan toner image and a black toner image are formed, respectively, and then are successively primary-transferred onto the toner images on the intermediary transfer belt 12 in a positional superposition manner.

The four color toner images carried on the intermediary transfer belt 12 are conveyed to the secondary transfer portion T2 and then are secondary-transferred collectively onto a recording material S separately conveyed to the secondary transfer portion T2.

The recording material S on which the toner images are secondary-transferred at the secondary transfer portion T2 is subjected to application of heat and pressure by a fixing device 14 applied in a vertical path portion 4 and is, after the toner images are fixed thereon, discharged onto a sheet discharge tray 5 by a sheet discharging roller 15.

At a lower side of an apparatus main assembly 3, a sheet feeding cassette 2 is provided so as to be capable of being pulled-out toward the front side. The recording material S, such as a recording sheet, pulled-out one by one from the sheet feeding cassette 2 is in stand-by in front of the secondary transfer portion T2 and then is sent into the secondary transfer portion T2 in synchronism with the toner images on the intermediary transfer belt 12.

At an upper side of the apparatus main assembly 3, an image reading portion (a flat head scanner in this embodiment) 6 is provided via the vertical path portion 4. The image reading portion 6 optically reads an image on a lower surface of an original placed on a reading surface (a glass plate in this embodiment) 6a to convert the image into image data. In an open (raised) state of an automatic document feeder (ADF) 7, the original can be placed on the reading surface 6a. The ADF 7 separates sheets of the original, stacked on an original tray 8, one by one and then passes the separated sheets one by one through the reading surface 6a, thus successively reading images on the sheets of the original by the image reading portion 6.

An operating panel (board) 11 is provided at the front side of the apparatus main assembly 3. At the vertical path portion 4 immediately under the operating panel 11, a recording material S conveying mechanism including the sheet discharging roller 15, various sensors, an air-blowing fan and the like are applied.

In an operation in an automatic image reading mode, the original is set on the original tray 8 of the ADF 7. In the operation in the automatic image reading mode, the operator can access the reading surface 6a of the image reading portion 6 by rotationally moving the ADF 7 toward the rear side to open the ADF 7 upward. Then, after the original is set on the original tray 8 of the ADF 7 (or on the reading surface 6a of the image reading portion 6), the operator inputs, through the operating panel 11, information on a monochromatic or color (image) reading mode, an output size of a copy, the type of the recording material S, the number of sheets for copy and the like.

On the basis of the information inputted through the operating panel 11, the image information of the original is read at the image reading portion 6. Then, the recording material S applied in the sheet feeding cassette 2 or on a manually feeding tray 9 in an open state is fed and subjected to image formation in the apparatus main assembly 3 and then is discharged and stacked on the sheet discharge tray 5 via the vertical path portion 4.

Incidentally, the image forming apparatus 1 in this embodiment can also form the image on the recording material S depending on the image information sent from an external device such as a personal computer and then output the recording material S.

2. Flexure and Distortion of Frame

In the color image formation, positional alignment of the respective color images (hereinafter referred to as "color misregistration correction") is an important factor of an image quality. Particularly, in the tandem-type image forming apparatus in which the toner images formed on the plurality of the image bearing members having parallel rotation shafts (axes) are superposedly transferred onto a transfer material, an error of the color misregistration correction appears as an amount of the color misregistration of the recording image as it is. As the transfer material onto which the toner images are transferred from the image bearing members, the intermediary transfer belt or the recording material conveyed by a sheet conveying belt may be used but in this embodiment the intermediary transfer belt is used.

As a cause of the error of the color misregistration correction, particularly, there are deformations, such as the flexure and the distortion, of the frame of the apparatus main assembly due to a disposition environment of the image forming apparatus (such as levelness, unevenness or rigidity of the surface on which the image forming apparatus is mounted). For example, in the case where the image forming apparatus is mounted on an uneven disposition surface, depending on a manner of supporting the image forming apparatus, the deformations such as the flexure and the distortion are generated. In the case where the deformation of the frame is caused, the rotation shafts of the plurality of the image bearing members are distorted, with the result that the positions of the respective color toner images are changed relative to each other and thus the change leads to the color misregistration on the recording image.

Further, also in the case where an endless belt (such as the intermediary transfer belt or the conveying belt) is stretched and conveyed by the rollers supported by the frame of the apparatus main assembly, the flexure and distortion of the frame are important factors. This is because the distortion of the frame means out of alignment of the rollers for stretching the endless belt and leads to an increase in (laterally) shifting force of the endless belt in the roller axis direction. The increase in shifting force of the endless belt is a factor leading to deterioration or breakage of an end portion of the belt, thus influences a lifetime of the endless belt.

As described above, the flexure and distortion of the frame of the apparatus main assembly are the important factors which influence equality of the image forming apparatus as a product.

3. Frame Supporting Structure

The position of the center of gravity of the image forming apparatus which has the influence on the flexure and distortion of the frame of the apparatus main assembly will be described.

Figure 2:
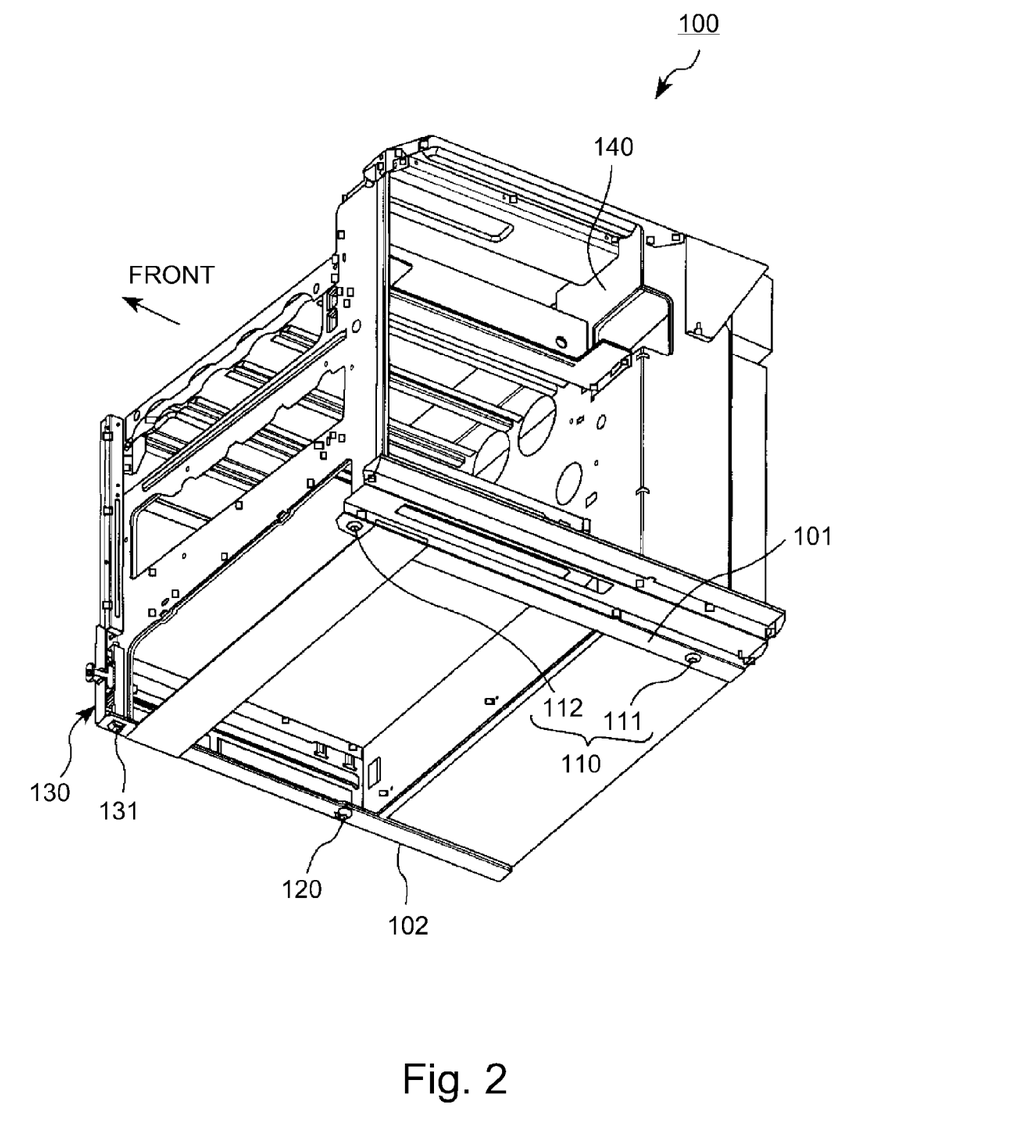
FIG. 2 is a perspective view showing a front surface, a right side surface and a bottom surface of a frame of the image forming apparatus in Embodiment 1.
Figure 3:
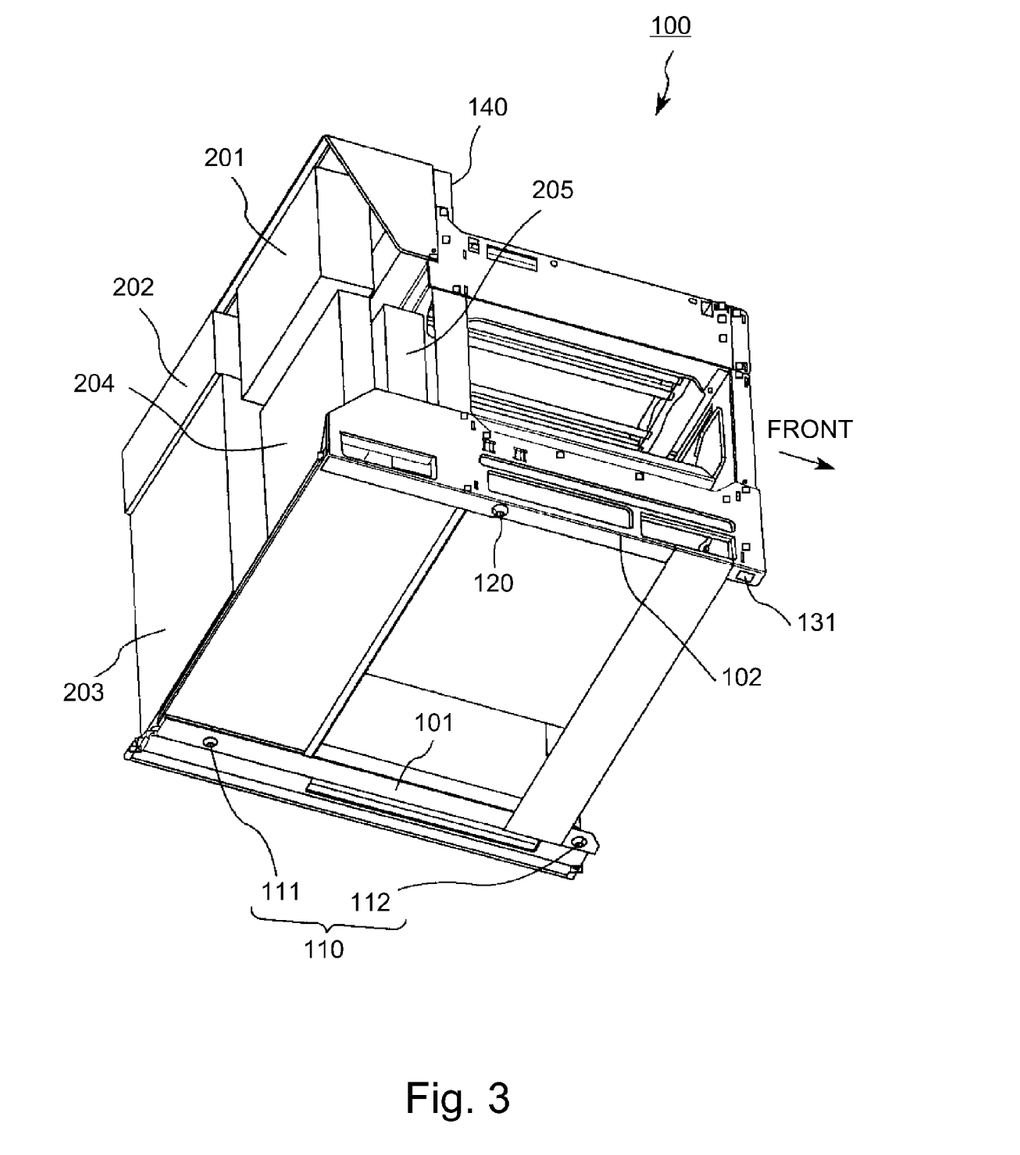
FIG. 3 is a perspective view showing a rear surface, a left side surface and the bottom surface of the frame of the image forming apparatus in Embodiment 1.
Figure 4:
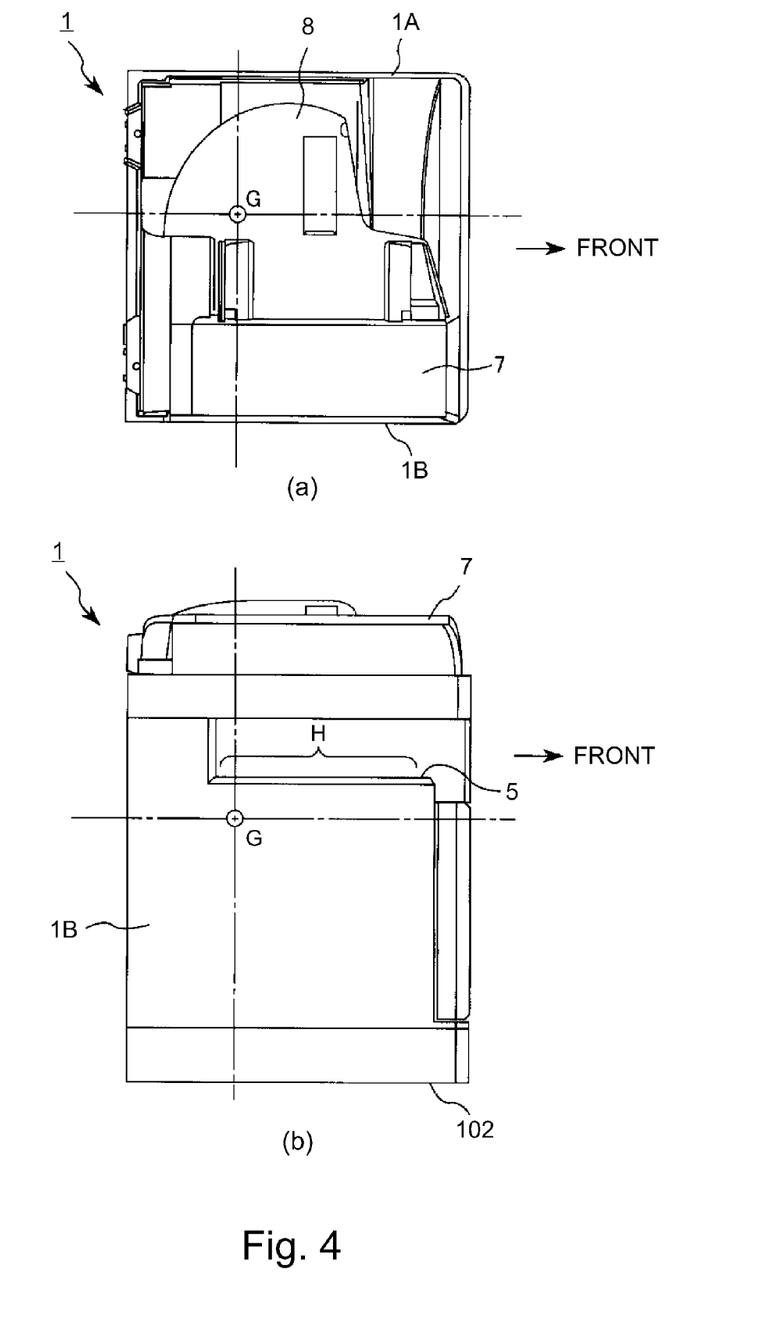
Figure 5:
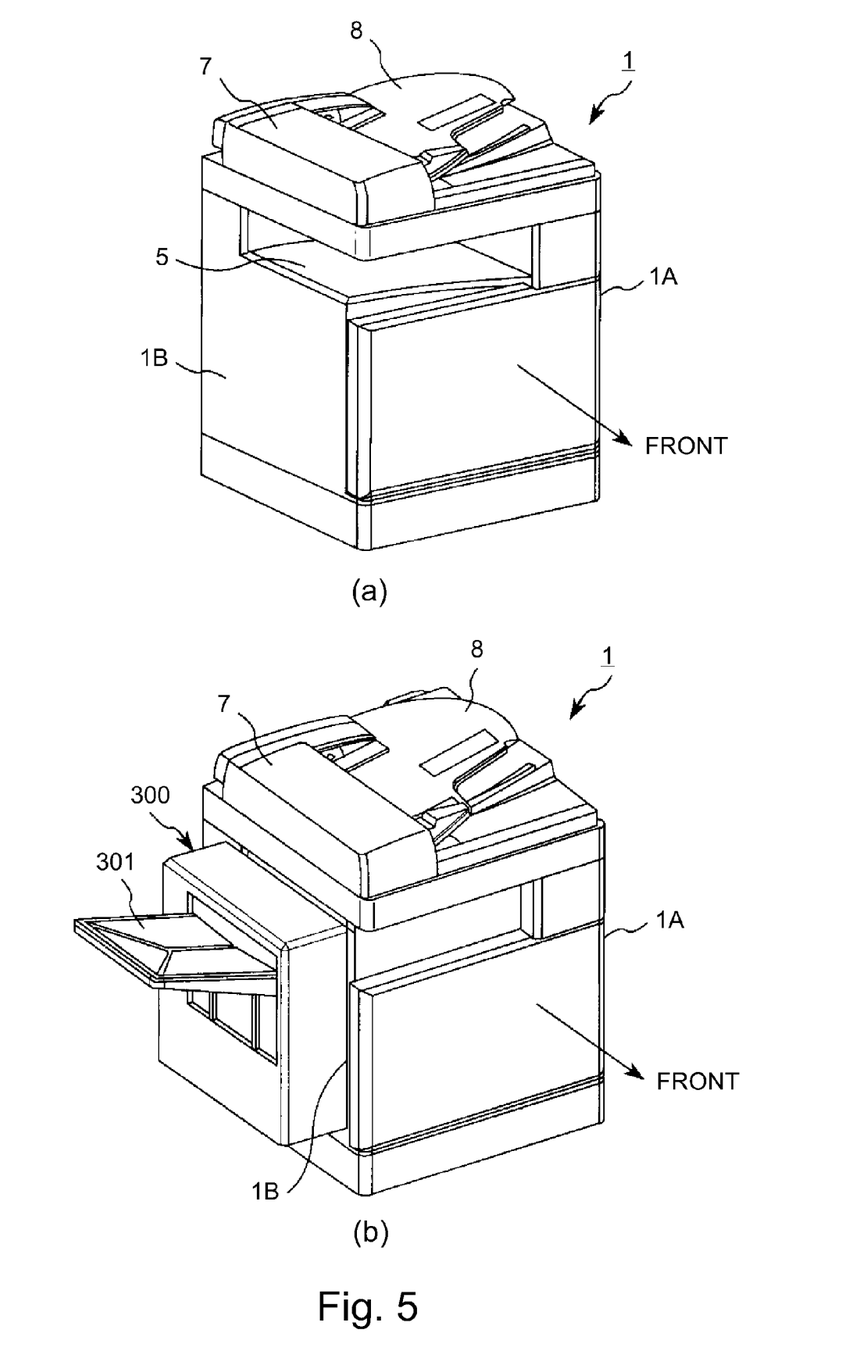

FIG. 2 is a perspective view showing a front surface, a right side surface and the bottom surface of a frame 100 of the apparatus main assembly 3 of the image forming apparatus 1 in this embodiment. FIG. 3 is a perspective view showing a rear surface, a left side surface and the bottom surface of the frame 100. Parts (a) and (b) of FIG. 4 are schematic views each showing an outer appearance of the image forming apparatus, wherein (a) shows the outer appearance as seen from an upper surface side, and (b) shows the outer appearance as seen from a left side surface side. Parts (a) and (b) of FIG. 5 are perspective views showing outer appearances of the image forming apparatus 1 before and after an optical device (optional unit) is mounted to the apparatus main assembly 3, respectively.

On a rear-side plate 140 (FIG. 3) which is one of constituent parts of the frame 100, a driving unit 205 in which a driving source of the image forming apparatus 1 is applied, controller units 201 and 202 in which electrical components are applied, a power source 203 and the like are mounted. The driving unit 205 and the electrical component units are constituted by using a metal plate in many cases and therefore their weights are heavier (larger) than the weights of the units mounted inside the frame 100. Therefore, the position of the center of gravity G of the image forming apparatus 1 is localized toward the rear surface side ((a) and (b) of FIG. 4). Each of (a) and (b) of FIG. 4 explicitly illustrates the position of the center of gravity G in the outer appearance of the image forming apparatus 1. As is understood from (a) and (b) of FIG. 4, the position of the center of gravity G of the image forming apparatus 1 is located closer to the rear surface side (backward) than the center of a rectilinear line connecting the front surface and rear surface of the image forming apparatus 1.

However, when the optical device is mounted to the image forming apparatus 1, the position of the center of gravity G of the image forming apparatus 1 is changed. For example, with respect to a plain model as shown in (a) of FIG. 5 in which the optical device is not mounted, the case where a post-sheet-discharge processing device 300 for the recording image (the recording material outputted from the apparatus main assembly) is mounted as the optical device to the apparatus main assembly 3 at the left side surface as shown in (b) of FIG. 5 is considered. Here, the post-sheet-discharge processing device 300, e.g., a post-processing device (finisher) for perforating a punch hole into the recording material, for stapling the plurality of sheets of the recording material, and for sorting sheets of the recording material every designated number of sheets or every group by shifting and stacking the sheets of the recording material. At this time, the position of the center of gravity of the apparatus main assembly 3 and the position of the center of gravity of the post-sheet-discharge processing device 300 do not coincide with each other. Therefore, by mounting the optical device to the apparatus main assembly 3 as described above, the position of the center of gravity G of the image forming apparatus 1 is changed.

Further, in the case where the sheets of the recording material are stacked on a stacking tray 301 provided to the post-sheet-discharge processing device 300, the position of the center of gravity of the sheets of the recording material is located on the center line (at the center of the sheet discharge tray 5 or the stacking tray 301 with respect to a direction substantially perpendicular to a conveyance direction of the recording material S) of a region H indicated in (b) of FIG. 4. For that reason, the position of the center of gravity G of the image forming apparatus 1 is changed toward the front surface side depending on the number of stack of the sheets of the recording material on the stacking tray 301 of the post-sheet-discharge processing device 300.

As described above, in many cases, the position of the center of gravity G of the image forming apparatus 1 is located toward the rear surface side of the image forming apparatus 1 (backward). Further, the position of the center of gravity G of the image forming apparatus 1 is not necessary non-changing but is changed depending on a mounting state of the optical device. Further, it would be sufficiently considered that a load of not less than an estimated value is exerted on the frame 100 when access to various exchange parts at the upper front surface side of the image forming apparatus 1 and an operation such that the operator places his (her) hand(s) on the image forming apparatus 1 are taken into consideration. Therefore, e.g., in the case where two disposition points sufficiently spaced from each other are provided along a lower edge line of the right-side surface of the apparatus main assembly 3 and one disposition point is provided along a lower edge line of the left-side surface of the apparatus main assembly 3, a flexure load exerted on this one disposition point is not negligible in some cases.

Therefore, in this embodiment, a supporting structure for the frame 100 as described below in general is employed. That is, three fixed supporting legs and one movable supporting leg provided separately from these three fixed supporting legs are provided. This one movable supporting leg is movable along the substantially vertical direction from a first position where the movable supporting leg is applied (retracted) inside the frame 100 to a second position where the movable supporting leg contacts the disposition surface of the image forming apparatus 1. Further, a position fixing means capable of fixing the movable supporting leg at an arbitrary second position varying depending on a height (level) of the disposition surface is provided.

The supporting structure for the frame 100 in this embodiment will be described more specifically below.

First, the image forming apparatus 1 includes at least two first supporting legs 110 provided along the lower edge line 101 of the frame 100 at the right-side surface as a first side surface 1A of the image forming apparatus 1 (hereinafter, the edge line 101 is referred to as a "right-side lower edge line" 101). In this embodiment, two first supporting legs 110 in total are provided at the rear-surface side and front-surface side of the image forming apparatus 1, respectively. Hereinafter, these first supporting legs 110 are referred to as a first fixed supporting leg (rear-surface side) 111 and a second fixed supporting leg (front-surface side) 112.

Further, the image forming apparatus 1 includes a second supporting leg 120 provided at least one position along the lower edge line 102 of the frame 100 at the left-side surface as a second side surface 1B (hereinafter, the edge line 102 is referred to as a "left-side lower edge line" 102). Hereinafter, the second supporting leg 120 is referred to as a third fixed supporting leg 120.

The first fixed supporting leg 111, the second fixed supporting leg 112 and the third fixed supporting leg 120 are fixed to or integrally formed with the frame 100 and are the fixed supporting legs having substantially non-changing heights. The first fixed supporting leg 111 and the second fixed supporting leg 112 are disposed with a sufficient spacing (interval) along the right-side lower edge line 101. Further, the first fixed supporting leg 111, the second fixed supporting leg 112 and the third fixed supporting leg 120 are disposed so that rectilinear lines connecting these supporting legs 111, 112 and 120 provide a substantially triangular shape, in which the center of gravity G is located, when the image forming apparatus 1 is viewed from the upper surface side.

Further, the image forming apparatus 1 includes, in a state in which the optical device is not mounted (in the plain state), one movable supporting leg 131, which is not required to be grounded on the disposition surface of the image forming apparatus 1, as the third supporting leg provided at least at one position along the left-side lower edge line 102. The movable supporting leg 131 is provided with a predetermined spacing from the third fixed supporting leg 120 along the left-side lower edge line 102.

In this embodiment, the image forming apparatus 1 is, in the state in which the optical device is not mounted, disposed on the disposition surface in a three-point supporting manner by the three fixed supporting legs, in total, consisting of the first fixed supporting leg 111, the second fixed supporting leg 112 and the third fixed supporting leg 120.

However, as described later in detail, also in the state in which the optical device is not mounted, it is possible to use the movable supporting leg 131 as desired.

Further, in this embodiment, the first fixed supporting leg 111 and the second fixed supporting leg 112 are provided in the frame 100 at the right-side surface of the image forming apparatus 1 where the feeding and conveyance of the recording material on which the recording image is carried are principally effected. This is because the influence of the flexure and the distortion on the alignment of the rollers for conveying the recording material can be effectively suppressed by supporting the frame 100 with reliability at the right-side surface of the image forming apparatus 1 where the feeding and conveyance of the recording material are effected. The first fixed supporting leg 111 is disposed at a position closer to (toward) the rear surface along the right-side lower edge line 101 than a position where the center of gravity G of the image forming apparatus 1 in the state in which the optical device is not mounted is projected vertically onto the right-side lower edge line 101. The second fixed supporting leg 112 is disposed at a position closer to (toward) the front surface along the right-side lower edge line 101 than a position where the center of gravity G of the image forming apparatus 1 in the state in which the optical device is not mounted is projected vertically onto the right-side lower edge line 101. Particularly, in this embodiment, the second fixed supporting leg 112 is disposed in the neighborhood of a front-side end portion of the right-side lower edge line 101. As a result, the occurrence of the flexure and distortion of the frame 100 due to the load applied by the operator or the like can be further effectively suppressed.

On the other hand, in this embodiment, the third fixed supporting leg 120 is provided in the frame 100 at the left-side surface opposing the right-side surface where the first fixed supporting leg 111 and the second fixed supporting leg 112 are provided. Particularly, in this embodiment, the third fixed supporting leg 120 is, as shown in (a) of FIG. 4, disposed in the neighborhood of the position where the center of gravity G of the image forming apparatus in the state in which the optical device is not mounted is projected vertically onto the left-side lower edge line 102. As a result, the influence of the load, by the weight of the image forming apparatus 1, on the frame 100 in the state in which the optical device is not mounted can be more effectively suppressed.

Further, the movable supporting leg 131 is disposed at a position closer, than the third fixed supporting leg 120, to a side where the position of the center of gravity G of the image forming apparatus 1 is changed along the left-side lower edge line 102 depending on an operation state. The direction in which the position of the center of gravity G of the image forming apparatus 1 is changed is such that the direction in which the position of the center of gravity G of the image forming apparatus 1 is moved, due to the mounting of the optical device and the load applied by the operator at the like, from the position where there are no mounting and no load is projected vertically onto the left-side lower edge line 102. In this embodiment, the direction is such that the position of the center of gravity G is moved from the neighborhood of the third fixed supporting leg 120 toward the front surface of the image forming apparatus 1 along the left-side lower edge line 102. Particularly, in this embodiment, the movable supporting leg 131 is disposed in the neighborhood of the front surface end portion of the left-side lower edge line 102. As a result, in the case where the change in position of the center of gravity G of the image forming apparatus 1 is caused due to the mounting of the optical device and the load applied by the operator and the like, the occurrence of the flexure and distortion of the frame 100 can be suppressed more effectively.

The movable supporting leg 131 is provided in a movable supporting leg unit 130 capable of moving the movable supporting leg 131 along the vertical direction from a first position where the movable supporting leg 131 is applied inside the frame 100 to a second position where the movable supporting leg 131 contacts the disposition surface of the image forming apparatus 1. The movable supporting leg unit 130 includes a position-fixing means capable of fixing the movable supporting leg 131 at the second position arbitrarily varying depending on the height (level) of the disposition surface relative to the first position. The movable supporting leg unit 130 will be described more specifically below.

Figure 6:
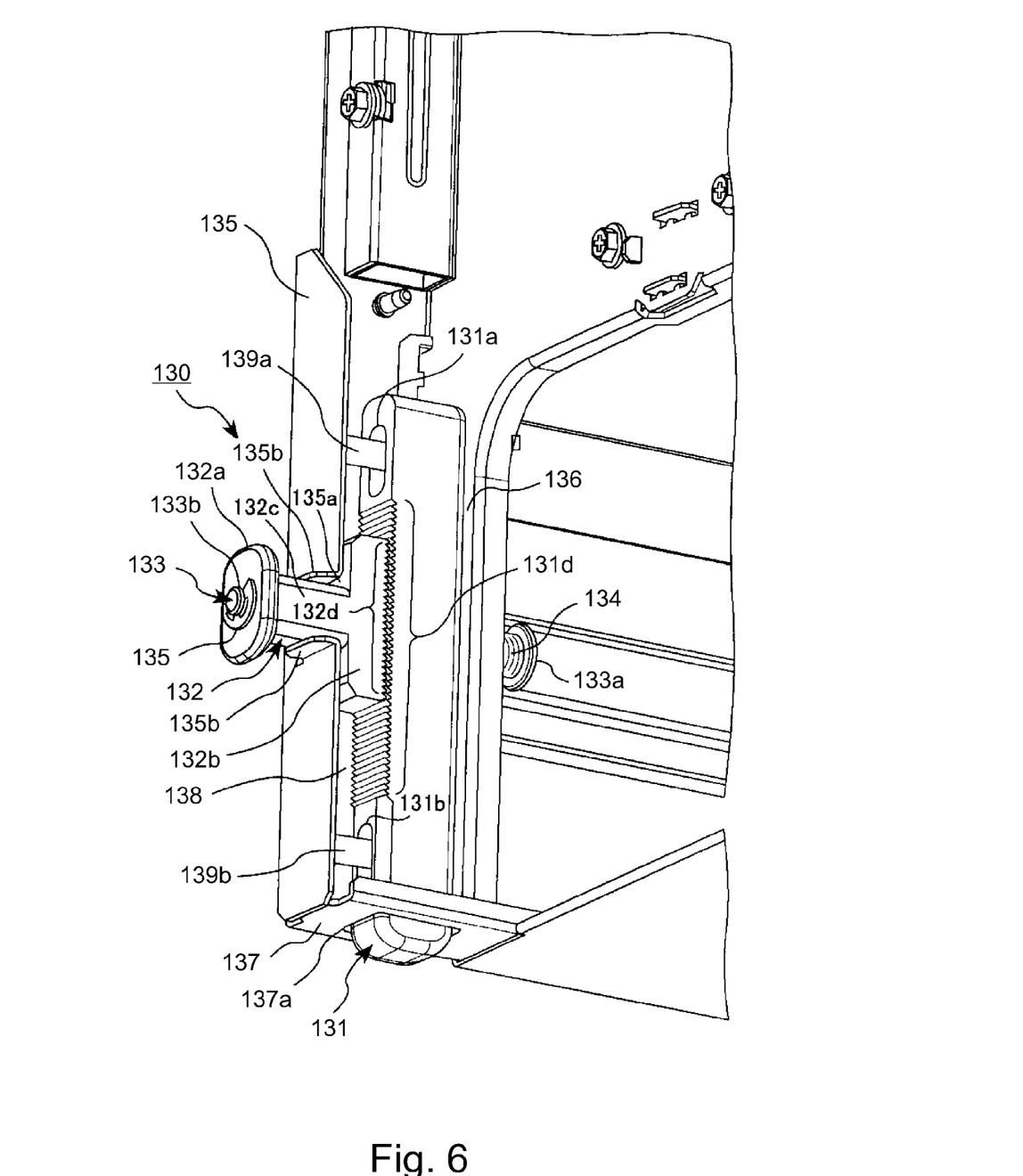
FIG. 6 is an enlarged perspective view showing a movable supporting leg provided on the frame of the image forming apparatus in Embodiment 1.
Figure 7:
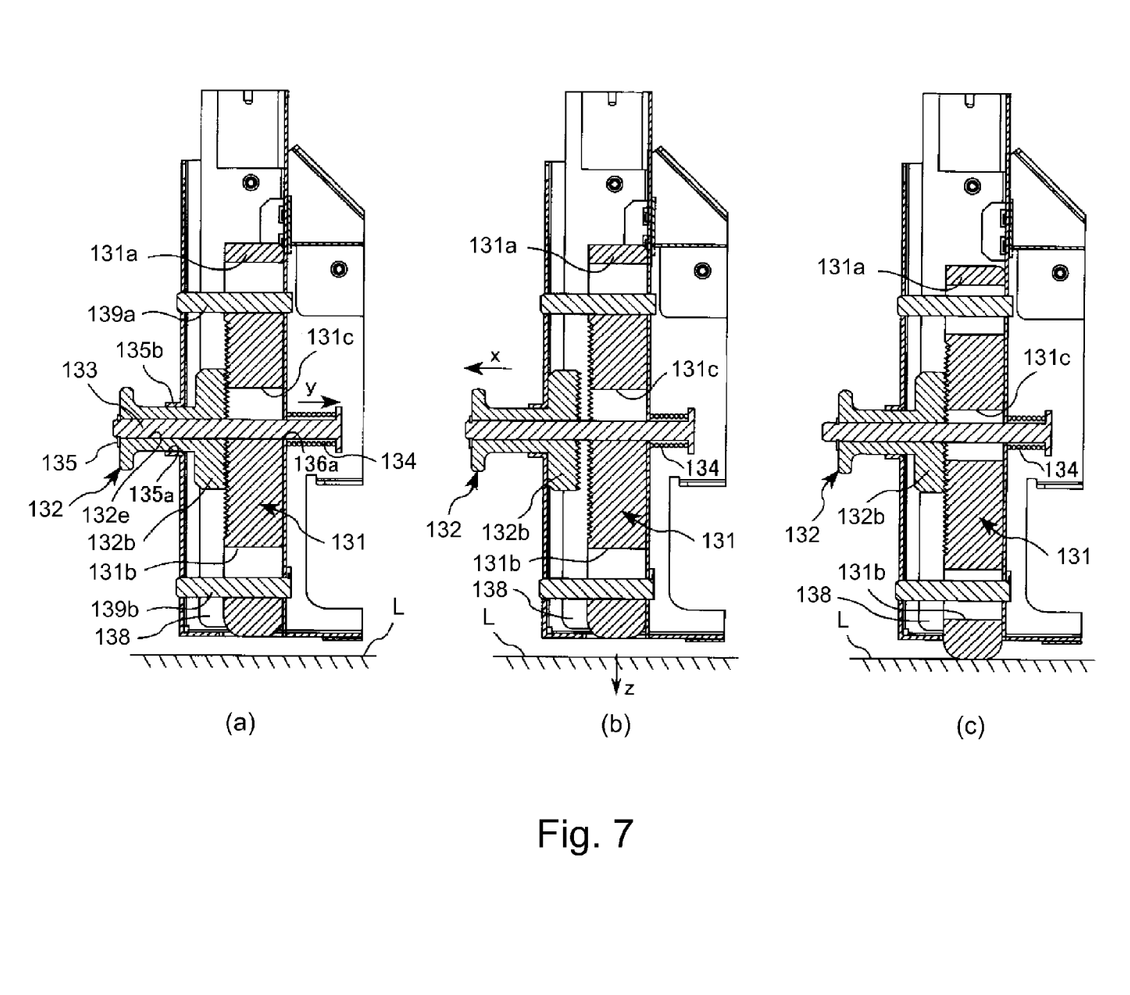

FIG. 6 is an enlarged perspective view of the movable supporting leg unit 130 as seen from the same direction as in FIG. 2. Parts (a), (b) and (c) of FIG. 7 are partially sectional side views of the movable supporting leg unit 130 as seen from the right-side surface and illustrate an operational process of the movable supporting leg unit 130.

In the movable supporting leg unit 130, the movable supporting leg 131 is movably applied in an accommodating portion 138 formed between a first accommodating portion side plate 135 and a second accommodating portion side plate 136 which are fixed on or integrally formed with the transfer 100. In this embodiment, at the bottom of the accommodating portion 138, a bottom plate 137 is provided. The movable supporting leg 131 is capable of being contacted to the disposition surface of the image forming apparatus 1 by being moved so that its lower portion in a predetermined range is exposed downward through an opening 137a provided in the bottom plate 137.

The movable supporting leg 131 has a substantially elongated rectangular prism shape and its longitudinal direction extends along the substantially vertical direction, so that the movable supporting leg 131 is vertically movable. The movable supporting leg 131 is provided with first and second elongated circular holes 131a and 131b, as a preventing action receiving portion for receiving the action of preventing movement (regulating a movement amount) of the movable supporting leg 131, in the neighborhoods of upper and lower end portions, respectively, of the movable supporting leg 131 with respect to its longitudinal direction. Each of the first and second elongated circular holes 131a and 131b penetrates through the movable supporting leg 131 in one direction. Further, the movable supporting leg 131 is provided with an escape hole 131c, between the first and second elongated circular holes 131a and 131b with respect to its longitudinal direction, for permitting escape of a stopper supporting shaft 133 described later. The escape hole 131c penetrates through the movable supporting leg 131 in the same direction as that of the elongated circular holes 131a and 131b.

Through the elongated circular holes 131a and 131b of the movable supporting leg 131, as a preventing (regulating) member for preventing the movement (regulating the movement amount) of the movable supporting leg 131, two preventing (regulating) shafts 139a and 139b fixed on the frame 100 are penetrated, respectively, so as to extend between the first and second accommodating portion side plates 135 and 136. Then, the preventing shafts 139a and 139b are engaged with the elongated circular holes 131a and 131b, respectively, so that the movable supporting leg 131 is vertically movable along the substantially vertical direction. The movement amount (distance) of the movable supporting leg 131 along the substantially vertical direction is determined by a longitudinal length of each of the elongated circular holes 131a and 131b. In the case where the movable supporting leg 131 is retracted upward, the movable supporting leg 131 is accommodated inside the frame 100 and more specifically is accommodated inside the accommodating portion 138 defined by the first and second accommodating portion side plates 135 and 136 and the bottom plate 137. This position is the first position of the movable supporting leg 131.

Incidentally, in this embodiment, the constitution in which the movable supporting leg 131 is provided in the apparatus main assembly is described but the present invention is not limited thereto. For example, a constitution in which a hole with which a height-adjustable supporting leg is engageable is provided at the position where the movable supporting leg 131 is provided on the bottom of the image forming apparatus in this embodiment may also be employed. Through the hole, the heat-adjustable supporting leg can be mounted when the optional unit is mounted. That is, even when the movable supporting leg is originally provided in the apparatus main assembly, the movable supporting leg unit 130 may only be required to be provided with a mechanism for mounting, to the image forming apparatus, a member having the same function as that of the movable supporting leg.

Further, the movable supporting leg unit 130 includes a stopper 132 for fixing the position of the movable supporting leg 131. The stopper 132 includes a shaft portion 132c, a handle 132a formed integrally with the shaft portion 132c at one end of the shaft portion 132c, and a stopper portion 132b formed integrally with the shaft portion 132c at the other end of the shaft portion 132c. Along an axial direction passing through a central portion of the shaft portion 132c of the stopper 132, a shaft-inserting hole which penetrates through the stopper 132 from the handle 132a to the stopper portion 132b is formed. The handle 132a is protruded toward the front-surface side of the image forming apparatus 1 so that the operator can operate the handle 132a from the front-surface side of the image forming apparatus. Incidentally, the handle 132a may also be provided inside a casing cover, for externally covering the frame 100 of the image forming apparatus 1, so as to permit the operator to access the handle 132a as desired.

The stopper 132 is movable in directions in which it is moved toward and away from the movable supporting leg 131 along the axial direction of the shaft portion 132c by guiding the shaft portion 132c by a stopper guide 135b which defines an edge of a stopper guide hole 135a penetrating through the first accommodating portion side plate 135. In this embodiment, the stopper 132 is movable along a direction (front-rear direction) perpendicular to the front surface and rear surface of the image forming apparatus 1. Into a shaft-inserting hole 132e of the stopper 132, a stopper supporting shaft 133 continuously extending in a straight line from the outside of the handle 132a to the outside of the accommodating portion 138 via the escape hole 131c of the movable supporting leg 131 and a through hole 136a of the second accommodating portion side plate 136 is inserted. Between the second accommodating portion side plate 136 and a flange portion 133a formed at an end portion of the stopper supporting shaft 133 close to the second accommodating portion side plate 136, a compression spring 134 as an urging member is provided. On the other hand, an end portion of the stopper supporting shaft 133 close to the handle 132a is fixed non-movably to the stopper 132 by the fixing member 135. Thus, the stopper 132 and the stopper supporting shaft 133 are integrally fixed and are movable along the axis of the stopper supporting shaft 133. Therefore, the stopper 132 is, when the stopper supporting shaft 133 is urged by the compression spring 134, urged toward the movable supporting leg 131. As a result, the movable supporting leg 131 is urged against the second accommodating portion side plate 136 of the image forming apparatus 1 by the stopper 132.

Further, by an urging force of the compression spring 134 locked between the second accommodating portion side plate 136 and the flange portion 133a provided at the end of the stopper supporting shaft 133, the stopper supporting shaft 133 is urged in an arrow y direction indicated in (a) of FIG. 7. Further, the stopper supporting shaft 133 and the stopper 132 are integrally fixed and therefore by the compression spring 134, the urging force for urging the movable supporting leg 131 against the second accommodating portion side plate 136 of the frame 100 is generated.

Further, at a surface of the movable supporting leg 131 urged by the stopper 132, a sawtooth locking claw 131d is formed. Further, also at a surface of the stopper 132 urged against the movable supporting leg 131, a similar-shaped sawtooth locking claw 132d is formed. Claw shape (claw angles) of the locking claws 131d and 132d provided at the surfaces of the movable supporting leg 131 and the stopper 132, respectively, are set in the following manner. That is, in the case where the movable supporting leg 131 is urged upward (in the case where the frame 100 is urged downward as seen from the movable supporting leg 131), the claw shapes of the locking claws 131d and 132d are set so that they are engaged with each other to non-movably fix the movable supporting leg 131.

In this embodiment, a fixing means for fixing the position of the movable supporting leg 131 relative to the frame 100 is constituted by the above-described stopper 132, stopper supporting shaft 133, compression spring 134, fixing member 135, locking claw 131d formed at the surface of the movable supporting leg 131, and the like.

Next, a procedure when the image forming apparatus 1 is disposed on the disposition surface and a change in supporting structure of the frame 100 will be described.

First, in the case where the optical device is not mounted to the image forming apparatus 1, as shown in (a) of FIG. 7, the movable supporting leg 131 is accommodated inside the accommodating portion 138 of the frame 100 (first position). For that reason, the image forming apparatus is supported on the disposition surface at three points by the first fixed supporting leg 111, the second fixed supporting leg 112 and the third fixed supporting leg 120. In this case, the frame 100 of the image forming apparatus 1 follows a flat surface formed by the three fixed supporting legs at the three points, so that the position of the center of gravity G of the image forming apparatus 1 in a stationary state can be regarded as being substantially not fluctuated. For that reason, the flexure and distortion of the frame 100 are not generated in principle.

Next, the movable supporting leg unit 130 is operated. As shown in (a) of FIG. 7, in a state immediately after the image forming apparatus 1 is disposed by the first fixed supporting leg 111, the second fixed supporting leg 112 and the third fixed supporting leg 120, the movable supporting leg 131 does not contact the disposition surface L. In this state, as shown in (b) of FIG. 7, when the stopper 132 is pulled in an arrow x direction, engagement between the locking claws 131d and 132d of the movable supporting leg 131 and the stopper 132, respectively, is released (eliminated). Then, the movable supporting leg 131 falls downward (in an arrow z direction) by its own weight to contact the disposition surface L (second position). Here, when the operator releases the stopper 132, as shown in (c) of FIG. 7, the locking claws 131d and 132d of the movable supporting leg 131 and the stopper 132 are engaged with each other, so that the movable supporting leg 131 is fixed so as not to be movable further.

In this state, the image forming apparatus 1 is supported at 4 points by the first to third fixed supporting legs 111, 112 and 120 and the movable supporting leg 131 without generating the flexure and distortion of the frame 100. Therefore, even when the load is exerted from immediately above the movable supporting leg 131 toward the lower portion, the load is received by the disposition surface L via the movable supporting leg 131, so that the load on the image forming apparatus 1 becomes minimum. Further, also in the case where the optical device is mounted, as described above, the frame 100 is supported at the 4 points in the state in which the frame 100 is free from the flexure and the distortion and therefore the flexure and distortion of the frame 100 can be suppressed even when the position of the center of gravity G of the image forming apparatus 1 is changed.

Incidentally, in order to change the state of the movable supporting leg 131 from the state in which the movable supporting leg 131 is contacted to the disposition surface to the state in which the movable supporting leg 131 is accommodated inside the accommodating portion 138, a procedure which is the reverse of the above-described procedure may be performed in general. That is, from the state shown in (c) of FIG. 7, the operator pulls the stopper 132 in the arrow x direction indicated in (b) of FIG. 7, so that the engagement between the locking claws 131d and 132d of the movable supporting leg 131 and the stopper 132 is released. In that state, as shown in (b) of FIG. 7, the movable supporting leg 131 is moved to the inside of the accommodating portion 138 of the frame 100 by the hand or the like of the operator. Then, as shown in (a) of FIG. 7, when the operator releases the stopper 132, the locking claws 131d and 132d of the movable supporting leg 131 and the stopper 132 are engaged with each other, so that the movable supporting leg 131 is fixed non-movably in the state in which the movable supporting leg 131 is accommodated inside the accommodating portion 138 of the frame 100.

Thus, the image forming apparatus 1 in this embodiment includes the image forming portion P where the image is formed on the recording material S and includes the frame 100 for supporting the image forming portion P. The image forming apparatus 1 includes the first supporting legs 110 (111, 112) provided at least at two positions along the first edge line 101 located at the lower portion of the first side surface of the image forming apparatus 1. Further, the image forming apparatus 1 includes the second supporting leg 120 provided along the second edge line 102 located at the lower portion of the second side surface, of the image forming apparatus 1, opposing the first side surface. Further, the image forming apparatus 1 includes the third supporting leg 131 provided along the second edge line 102. This third supporting leg 131 is disposed along the second edge line 102 at the position closer, than the second supporting leg 120, to the side (portion) where the position of the center of gravity G of the image forming apparatus 1 is changed depending on the operation state of the image forming apparatus 1. Further, the third supporting leg 131 is movable along the substantially vertical direction from the first position in which the third supporting leg 131 is accommodated so as not to contact the disposition surface L of the image forming apparatus 1 to the second position in which the third supporting leg 131 is contacted to the disposition surface L of the image forming apparatus 1. In addition, the image forming apparatus 1 further includes the position fixing means capable of fixing the third supporting leg 131 at the second position depending on the height (level) of the disposition surface L of the image forming apparatus 1. In this embodiment, the position fixing means is constituted by the stopper 132, the stopper supporting shaft 133, the compression spring 134, the fixing member 135, the locking claw 131d formed at the surface of the movable supporting leg 131, and the like. Further, in this embodiment, at the second side surface of the image forming apparatus 1, the optical device 300 is detachably mountable to the image forming apparatus 1 and the position of the center of gravity G of the image forming apparatus 1 is changed by mounting the optical device 300 in the state as the operation state of the image forming apparatus 1. Further, in this embodiment, the optical device 300 includes the tray 301 on which the sheets of the recording material S supplied from the image forming apparatus 1 to the optical device 300 are to be stacked. In this case, the position of the center of gravity G of the image forming apparatus 1 is changed also depending on the amount (the number of sheets) of the recording material S stacked on the tray 301 in the state as the operation state of the image forming apparatus 1. Incidentally, in this embodiment, along the first side surface of the image forming apparatus 1, a conveying path through which the recording material S on which the image is formed is conveyed is provided and the image forming apparatus 1 is supported by the first supporting legs 110 (111, 112) provided at least at two positions at the first side surface.

As described above, according to this embodiment, by the constitution which is simple and relatively inexpensive, it is possible to suppress the flexure and distortion of the frame of the apparatus main assembly irrespective of the change or fluctuation in the position of the center of gravity G of the image forming apparatus due to the state of the disposition surface of the image forming apparatus and the presence or absence of the optical device.

Embodiment 2

Next, Embodiment 2 will be described. Basic constitution and operation of an image forming apparatus in this embodiment are the same as those in Embodiment 1. Therefore, constituent elements having the same or corresponding functions and structures as those for the image forming apparatus in Embodiment 1 are represented by the same reference numerals or symbols and will be omitted from detailed description.

Figure 8:
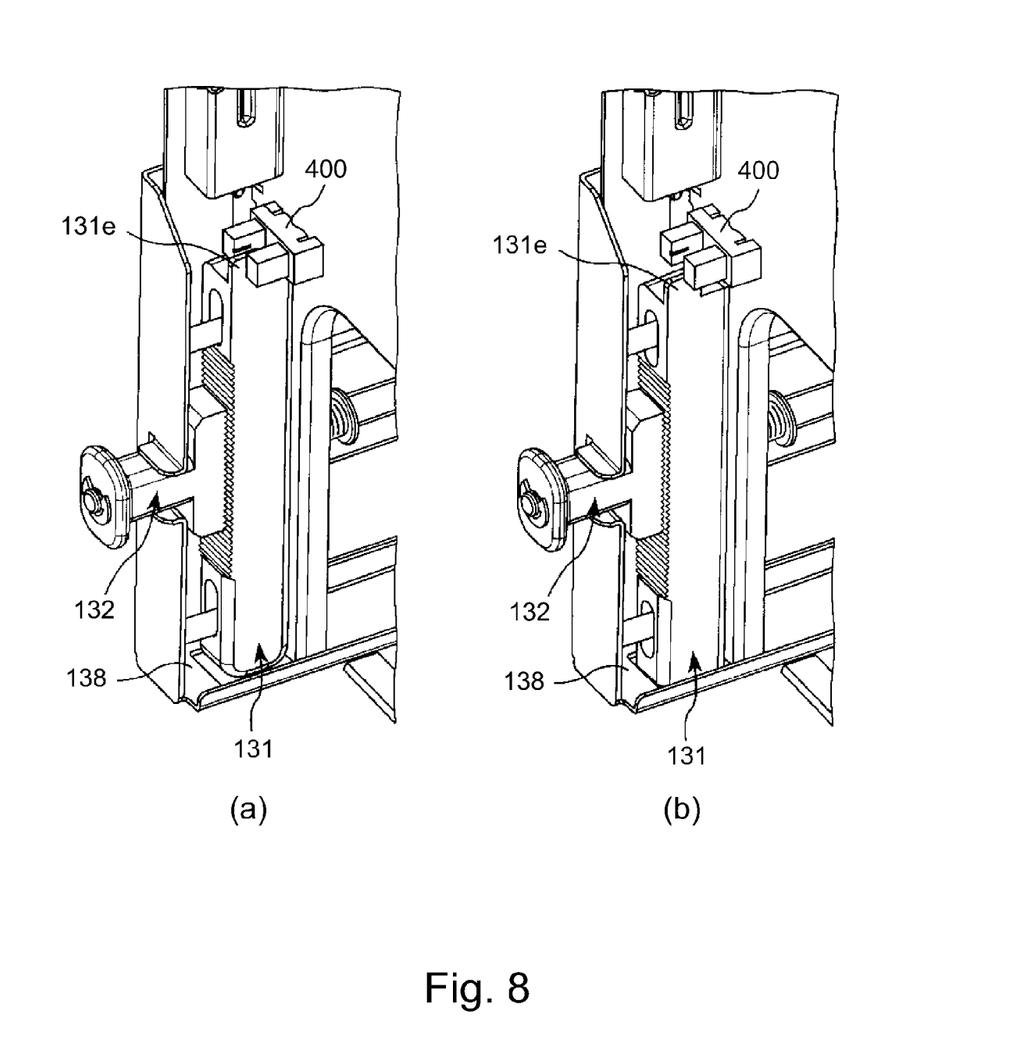

In this embodiment, the image forming apparatus 1 includes, as shown in (a) and (b) of FIG. 8, a position detecting means for the movable supporting leg 131.

That is, in this embodiment, the image forming apparatus 1 is provided with a photo-interruptor 400 which is an optical detecting means as the position detecting means. Further, at an upper end of the movable supporting leg 131 with respect to the longitudinal direction, a light-blocking flag 131e for light-blocking a detecting portion of the photo-interruptor 400 is provided. The photo-interruptor 400 disposed so that it is light-blocked by the light-blocking flag 131e when the movable supporting leg 131 is located at the first position in which the movable supporting leg 131 is accommodated inside the accommodating portion 138 of the frame 100 ((a) of FIG. 8). When the movable supporting leg 131 is located at the second position in which the movable supporting leg 131 is contacted to the disposition surface, the light-blocking flag 131e is not located at the position in which the photo-interruptor 400 is light-blocked ((b) of FIG. 8). Incidentally, as the position detecting means, it is possible to use any means for detecting the position of the movable supporting leg 131 by detecting a change in state optically, mechanically or electrically depending on whether the movable supporting leg 131 is located at the first position or the second position. For example, in place of the above-described photo-interruptor, a micro-switch or the like may also be used.

Therefore, in the case where the image forming apparatus 1 is supported at the three points other than the point of the movable supporting leg 131 without mounting the optical device thereto, the movable supporting leg 131 is a state in which the photointerruptor 400 detects that the movable supporting leg 131 is accommodated inside the accommodating portion 138 of the frame 100. In this case, when the image forming apparatus 1 is provided with the operating panel 11 as a displaying means capable of displaying the state of the image forming apparatus 1, the operator can make reference to information on the position of the movable supporting leg 131 through the operating panel 11. Specifically, as a control means, e.g., a controller (not shown) for effecting integrated control of the operation of the image forming apparatus 1 discriminates the position of the movable supporting leg 131 (whether the movable supporting leg 131 is located at the first position or the second position) from a detection signal by the photo-interruptor 400. Then, the controller displays, depending on its discrimination result, the information on the position of the movable supporting leg 131 on the operating panel 11 by a command through the operating panel 11 or at all times.

Further, the image forming apparatus 1 can be provided with a mounting detecting means for detecting that the optical device such as the post-sheet-discharge processing device 300 is mounted to the apparatus main assembly 3. As the mounting detecting means, similarly as in the case of the above-described position detecting means, it is possible to use any means for detecting whether or not the optical device is mounted by detecting the change in state optically, mechanically or electrically depending on the presence or absence of the optical device. For example, similarly as in the case of the position detecting means, it is possible to use the photo-interruptor, the micro-switch or the like. In this case, the controller is capable of displaying the information on the position of the movable supporting leg 131 on the operating panel 11 in the following manner, e.g., in the case where both of the mounting of the optical device, such as the post-sheet-discharge processing device 300, and the accommodation of the movable supporting leg 131 are detected. That is, it is possible to clearly display a massage such as "Please demount post-sheet-discharge processing device and pull stopper" so as to notify the operator of the proper procedure for changing the supporting structure.

Thus, in this embodiment, the image forming apparatus 1 includes the position detecting means 400 capable of detecting that the third supporting leg 131 is located at the first position and includes the displaying means for displaying the information on the position of the third supporting leg 131. Further, the image forming apparatus 1 may also include the mounting detecting means capable of detecting that the optical device 300 is mounted. In this case, the displaying means can display the information on the position of the third supporting leg 131 detected by the position detecting means when the mounting detecting means detects the mounting of the optical device 300.

As described above, according to this embodiment, an effect similar to that in Embodiment 1 can be obtained and in addition, the operator can check the state of the movable supporting leg and can be urged to change the supporting structure of the image forming apparatus.

Other Embodiments

As described above, the present invention is described based on several specific embodiments but is not limited to the above-described embodiments. For example, as the means for fixing the movable supporting leg to the frame, a means for fastening the movable supporting leg to the frame with a screw or the like may also be used. Further, in the above-described embodiments, the two first supporting legs are used but it is also possible to use a further large number of first supporting legs, e.g., by dividing either one or both of the first fixed supporting leg and the second fixed supporting leg in the above-described embodiments into a plurality of supporting legs. Also in this embodiment, when an amount of flexure of the frame is small among the divided supporting legs to the extent that the flexure amount is allowable, it is possible to obtain the same effects as those obtained in the above-described embodiments. Further, in the above-described embodiments, the single second supporting legs is used but it is also possible to use a plurality of second supporting legs, e.g., by dividing the third fixed supporting leg in the above-described embodiments into a plurality of supporting legs. Also in this embodiment, when an amount of flexure of the frame is small among the divided supporting legs to the extent that the flexure amount is allowable, it is possible to obtain the same effects as those obtained in the above-described embodiments. Further, in the above-described embodiments, the single third supporting legs are used but it is also possible to provide a plurality of third supporting legs. Also in this embodiment, when an amount of flexure of the frame is small among the plurality of the third supporting legs to the extent that the flexure amount is allowable, it is possible to obtain the same effects as those obtained in the above-described embodiments. Further, the use of the third supporting leg is not limited to the use only in the case where the optical device is used. For example, a manufacture of the image forming apparatus can instruct the operator that the third supporting leg is usable as desired even when the optical device is not mounted while recommending the third-point support, for general use, which places importance on suppression of the flexure and distortion of the frame caused due to the unevenness of the disposition surface and the like.

Incidentally, the effect which can be obtained from the above-described constitution is conspicuous with advancement of downsizing of the image forming apparatus and weight reduction of the frame. That is, it can be said that the present invention is a technique for meeting demands for downsizing and cost reduction which are marketing needs for recent image forming apparatuses.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 126668/2011 filed Jun. 6, 2011, which is hereby incorporated by reference.

What is claimed is:

1. An image forming apparatus for supporting a detachably mountable optional unit, comprising:

an image forming portion, including a rotatable photosensitive member, for forming a toner image formed on the photosensitive member on a recording material;

a frame for supporting said image forming portion, wherein said frame includes a first frame which is provided on a bottom of said image forming apparatus and which corresponds to a first side surface of said image forming apparatus and includes a second frame which is provided on the bottom of said image forming apparatus and which corresponds to a second side surface, opposing the first side surface, of said image forming apparatus;

a first supporting portion and a second supporting portion, which are provided close to the first frame, for supporting said frame and in contact with a disposition surface, wherein a first rectilinear line connecting said first and second supporting portions is substantially parallel to a rotational axis of the photosensitive member;

a third supporting portion for supporting said frame in contact with the disposition surface, wherein said third supporting portion is provided close to the second frame and in a neighborhood of a second rectilinear line which is perpendicular to the first rectilinear line connecting said first and second supporting portions and passes through a center of gravity of said image forming apparatus in a state in which the optional unit is not mounted; and an auxiliary leg adjustable between a height where it does not contact the disposition surface and a height where it contacts the disposition surface, wherein said auxiliary leg is provided close to the second frame, wherein when a position where the center of gravity of said image forming apparatus before the optional unit is mounted to said image forming apparatus is projected vertically onto an edge line of the second frame is a first position and a position where the center of gravity of said image forming apparatus after the optional unit is mounted to said image forming apparatus is projected vertically onto the edge line of the second frame is a second position, a direction from a position where said third supporting portion is projected vertically onto the edge line of the second frame toward a position where said auxiliary leg is projected vertically onto the edge line of the second frame is the same direction as a direction from the first position toward the second position.

2. An image forming apparatus according to claim 1, further comprising:
a mounting detecting device for detecting whether or not the optional unit is mounted to said image forming apparatus; and
a display portion for displaying an urging message of contact of said third supporting portion to the disposition surface.

3. An image forming apparatus according to claim 2, further comprising:
a fixing device, provided close to the first side surface, for fixing the image formed on the recording material; and
a conveying path, along the first side surface, for conveying the recording material on which the image is formed,
wherein a position of the center of gravity in a state in which the optional unit is not mounted is closer to the first side surface than the second side surface.

4. An apparatus according to claim 1, wherein said auxiliary leg is provided at a position shifted in a direction along the bottom of said second side surface relative to said third supporting portion.

5. An apparatus according to claim 1, wherein said auxiliary leg is provided at a corner of the bottom of said frame.

6. An apparatus according to claim 1, wherein said auxiliary leg and said third supporting portion are provided on the second frame.

7. An apparatus according to claim 1, wherein said first and second supporting portions are provided on the second frame.

8. An apparatus according to claim 1, wherein each of said first, second and third supporting portions is fixed so as to be unadjustable with respect to a height direction of a main assembly of said image forming apparatus.

9. A connecting method of connecting an optional unit to an image forming apparatus according to claim 1, said connecting method comprising:
a first step of adjusting a height of the auxiliary leg of the image forming apparatus, provided on the disposition surface in a state in which the optional unit is not mounted, to a height where the auxiliary leg does not contact the disposition surface;
a second step of adjusting the height of the auxiliary leg to a height where the auxiliary leg contacts the disposition surface while maintaining a state in which all of the first, second and third supporting portions of the image forming apparatus provided on the disposition surface in the state in which the optional unit is not mounted are prevented from being separated from the disposition surface; and
a third step of mounting the optional unit to a main assembly of the image forming apparatus.

10. An image forming apparatus connectable to an optional unit, comprising:
an image forming portion, including a rotatable photosensitive member, for forming a toner image formed on the photosensitive member on a recording material;
a frame for supporting said image forming portion, wherein said frame includes a first frame which is provided on a bottom of said image forming apparatus and which corresponds to a first side surface of said image forming apparatus, and includes a second frame which is provided on the bottom of said image forming apparatus and which corresponds to a second side surface, opposing the first side surface, of said image forming apparatus;
a first supporting portion and a second supporting portion, which are provided close to the first frame, for supporting said frame and in contact with a disposition surface, wherein a first rectilinear line connecting said first and second supporting portions is substantially parallel to a rotational axis of the photosensitive member;
a third supporting portion for supporting said frame and in contact with the disposition surface, wherein said third supporting portion is provided close to the second frame and in a neighborhood of a second rectilinear line which is perpendicular to the first rectilinear line connecting said first and second supporting portions and passes through a center of gravity of said image forming apparatus in a state in which the optional unit is not mounted; and
a mounting portion to which an auxiliary leg adjustable to a height where it does not contact the disposition surface and a height where it contacts the disposition surface is mountable, wherein said mounting portion is provided close to the second frame,
wherein when a position where the center of gravity of said image forming apparatus before the optional unit is mounted to said image forming apparatus is projected vertically onto an edge line of the second frame is a first position and a position where the center of gravity of said image forming apparatus after the optional unit is mounted to said image forming apparatus is projected vertically onto the edge line of the second frame is a second position, a direction from a position where said third supporting portion is projected vertically onto the edge line of the second frame toward a position where said mounting portion is projected vertically onto the edge line of the second frame is the same direction as a direction from the first position toward the second position.

11. An apparatus according to claim 10, wherein said mounting portion is provided at a position shifted in a direction along the bottom of said second side surface relative to said third supporting portion.

12. An apparatus according to claim 10, wherein said mounting portion is provided at a corner of the bottom of said frame.

13. An apparatus according to claim 10, wherein said mounting portion and said third supporting portion are provided on the second frame.

14. An apparatus according to claim 10, wherein said first and second supporting portions are provided on the second frame.

15. An apparatus according to claim 10, wherein each of said first, second and third supporting portions is fixed so as to be unadjustable with respect to a height direction of a main assembly of said image forming apparatus.

16. An image forming apparatus for supporting a detachably mountable optional unit, comprising:

an image forming portion, including a rotatable photosensitive member, for forming a toner image formed on the photosensitive member on a recording material;

a frame for supporting said image forming portion, wherein said frame includes a first frame which is provided on a bottom of said image forming apparatus and which corresponds to a first side surface of said image forming apparatus, and includes a second frame which is provided on the bottom of said image forming apparatus and which corresponds to a second side surface, opposing the first side surface, of said image forming apparatus;

a first supporting portion and a second supporting portion, which are provided close to the first frame, for supporting said frame and in contact with a disposition surface, wherein a first rectilinear line connecting said first and second supporting portions is substantially parallel to a rotational axis of the photosensitive member;

a third supporting portion for supporting said frame and in contact with the disposition surface, wherein said third supporting portion is provided at said second frame and in a neighborhood of a second rectilinear line which is perpendicular to the first rectilinear line connecting said first and second supporting portions and passes through a center of gravity of said image forming apparatus in a state in which the optional unit is not mounted; and an auxiliary leg adjustable to a height where it does not contact the disposition surface and a height where it contacts the disposition surface, wherein said auxiliary leg is provided at the second frame, wherein when a position where the center of gravity of said image forming apparatus before the optional unit is mounted to said image forming apparatus is projected vertically onto an edge line of the second frame is a first position and a position where the center of gravity of said image forming apparatus after the optional unit is mounted to said image forming apparatus is projected vertically onto the edge line of the second frame is a second position, a direction from a position where said third supporting portion is projected vertically onto the edge line of the second frame toward a position where said auxiliary leg is projected vertically onto the edge line of the second frame is the same direction as a direction from the first position toward the second position.

17. An apparatus according to claim 16, wherein said auxiliary leg is provided at a corner of the bottom of said frame.

18. An apparatus according to claim 17, wherein said first and second supporting portions are provided on the first frame.

19. An apparatus according to claim 17, wherein each of said first, second and third supporting portions is fixed so as to be unadjustable with respect to a height direction of a main assembly of said image forming apparatus.

20. An image forming apparatus connectable to an optional unit, comprising:

an image forming portion, including a rotatable photosensitive member, for forming a toner image formed on the photosensitive member on a recording material;

a frame for supporting said image forming portion, wherein said frame includes a first frame which is provided on a bottom of said image forming apparatus and which corresponds to a first side surface of said image forming apparatus, and includes a second frame which is provided on the bottom of said image forming apparatus and which corresponds to a second side surface, opposing the first side surface, of said image forming apparatus;

a first supporting portion and a second supporting portion, which are provided close to the first frame, for supporting said frame and in contact with a disposition surface, wherein a first rectilinear line connecting said first and second supporting portions is substantially parallel to a rotational axis of the photosensitive member;

a third supporting portion for supporting said frame and in contact with the disposition surface, wherein said third supporting portion is provided at said second frame and in a neighborhood of a second rectilinear line which is perpendicular to the first rectilinear line connecting said first and second supporting portions and passes through a center of gravity of said image forming apparatus in a state in which the optional unit is not mounted; and a mounting portion to which an auxiliary leg adjustable to a height where it does not contact the disposition surface and a height where it contacts the disposition surface is mountable, wherein said mounting portion is provided at the second frame, wherein when a position where the center of gravity of said image forming apparatus before the optional unit is mounted to said image forming apparatus is projected vertically onto an edge line of the second frame is a first position and a position where the center of gravity of said image forming apparatus after the optional unit is mounted to said image forming apparatus is projected vertically onto the edge line of the second frame is a second position, a direction from a position where said third supporting portion is projected vertically onto the edge line of the second frame toward a position where said mounting portion is projected vertically onto the edge line of the second frame is the same direction as a direction from the first position toward the second position.

21. An apparatus according to claim 20, wherein said mounting portion is provided at a corner of the bottom of said frame.

22. An apparatus according to claim 20, wherein each of said first, second and third supporting portions is fixed so as to be unadjustable with respect to a height direction of a main assembly of said image forming apparatus.

23. An apparatus according to claim 20, wherein said first and second supporting portions are provided on the first frame.

* * * * *